Apr. 24, 1923.

F. STITZEL

SPRING WHEEL

Filed Oct. 13, 1922

1,452,623

Inventor
Frederick Stitzel
by
Attorney

Patented Apr. 24, 1923.

1,452,623

UNITED STATES PATENT OFFICE.

FREDERICK STITZEL, OF LOUISVILLE, KENTUCKY.

SPRING WHEEL.

Application filed October 13, 1922. Serial No. 594,287.

*To all whom it may concern:*

Be it known that I, FREDERICK STITZEL, a citizen of the United States, residing at Louisville, in the county of Jefferson and State of Kentucky, have invented a certain new and useful Improvement in Spring Wheels, of which the following is a full, clear, and exact description.

This invention relates to that type of spring wheels for vehicles, in which there are an inner and an outer rim connected by a resilient medium.

The present invention consists of a resilient medium composed of a pneumatic tube and assembly means for connecting it with the inner and outer rims in such way as to provide a cushioned wheel adapted to absorb the shocks of travel, as I will proceed now to explain and finally claim.

Figure 1:
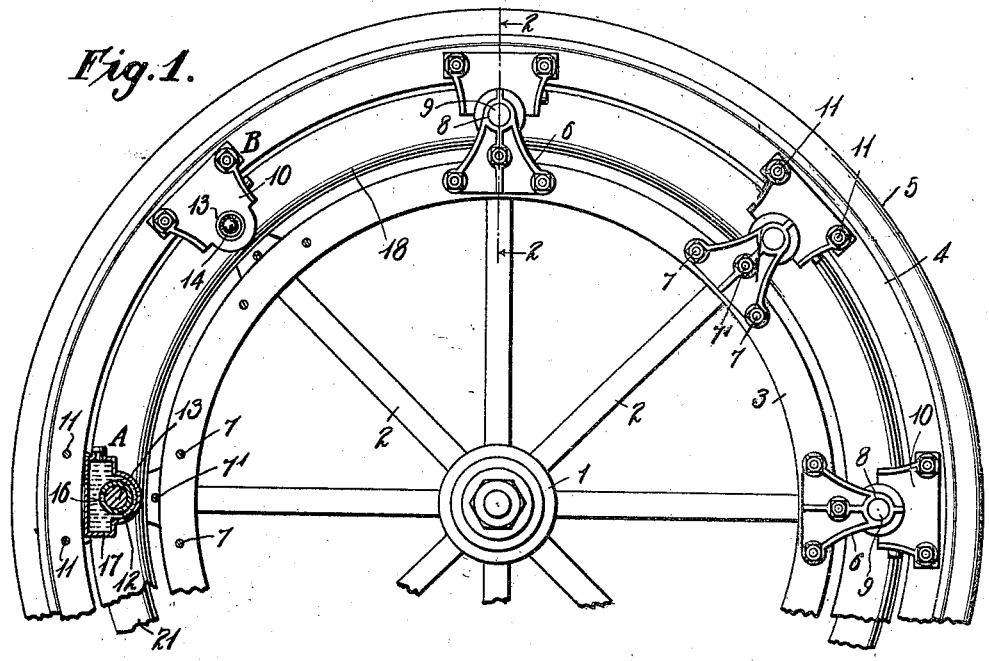
Figure 2:
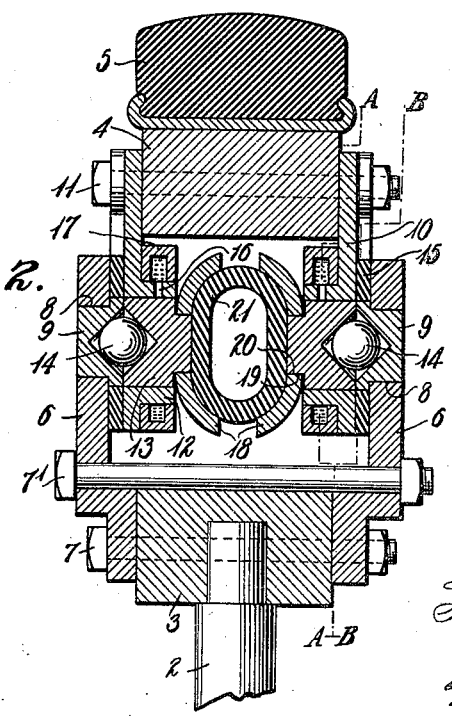

In the accompanying drawings illustrating the invention, in the several figures of which like parts are similarly designated, Figure 1 is a partly sectional elevation of about half of a wheel, showing at A a section on line A, Fig. 2, and at B a section on line B, Fig. 2. Fig. 2 is a cross-section on a larger scale on line 2—2, Fig. 1.

The hub 1, spokes 2, inner rim 3, and the union of the hub and inner rim, the outer rim 4, and the tire 5, of rubber or other material, may all be of any usual or approved construction.

The inner rim is provided with housings 6 secured thereto as by transverse bolts 7 and tie-bolts 7′. These housings extend outwardly from the inner rim and are provided with openings 8 to receive the socketed bearing pieces 9.

The outer rim 4 is provided with the inwardly extending housings 10 secured thereto by bolts 11, and these housings are constructed with the tubular bosses 12 in which are placed the socketed bearing pieces 13 complemental to the bearing pieces 9 in the housings 6, and between these socketed bearing pieces are placed the balls 14 to provide the necessary shifting motion as the load varies on the wheel, and at the same time to prevent the escape of the outer rim. Suitable packing 15 is interposed between the housings 6 and 10 where they overlap, and in such relation to the meeting edges of the socketed bearing pieces 9 and 13 as to prevent the escape of the lubricant hereinafter referred to.

The tubular bosses 12 have in them holes 16 in open communication with the lubricant containers 17 which are mounted on these bosses.

The socketed bearings 13 support concavo-convex or equivalent rings 18, said bearings having projections 19 which engage holes 20 in said rings, and these projections are of a depth equal to the thickness of the rings and of less diameter than the diameter of the bearings themselves so that when assembled with the rings, the rings are not only supported but their movement away from one another is absolutely and unconditionally controlled by the bearings.

Between these rings 18 is mounted a pneumatic tube or air cushion 21. This pneumatic tube may be inflated and deflated in any usual or approved way, not shown. This pneumatic tube constitutes the spring element of the wheel, and it is of sufficient strength to absorb the shocks incident to the use of such wheels, and it affords a cushioned wheel of efficient and durable quality. It is superior to a metallic cushioning means in that metallic springs deteriorate in resiliency and frequently become dead owing to their elastic limit being overcome by shocks. The pneumatic tube or air spring of substantially the character shown and described, or even a resilient medium of plastic material not depending upon air for its resiliency, has many other advantages over the metallic springs so frequently proposed for use in the construction of spring wheels.

Variations in the details of construction and arrangement of parts are permissible within the principle of the invention and the scope of the claims following.

What I claim is:—

1. A spring wheel, having an inner rim and an outer rim, and flexible connections for these rims, consisting of overlapping housings extending toward each other from the inner and outer rim, bearings carried by said housings, rings carried by one of these sets of bearings and interposed between the housings, and a non-metallic resilient medium interposed between the rings.

2. A spring wheel, having an inner rim and an outer rim, and flexible connections for these rims, consisting of overlapping housings extending toward each other from the inner and outer rims, bearings carried by said housings, concavo-convex rings mounted on these bearings and having a limited outward movement imposed upon them by said bearings, and a pneumatic tube interposed between and carried by said rings and responsive to the movement of the outer rim.

3. A spring wheel, having an inner rim and an outer rim, and flexible connections for these rims, consisting of overlapping housings extending toward each other from the inner and outer rims, the outer rim housings having tubular bosses and the inner rim housings having openings therein, socketed bearings arranged in said housings and opposing one another, a resilient member supported between the bearings and responsive to the movement of the bearings, packing interposed between the housings, and means carried by the tubular bosses for lubricating the bearings.

4. A spring wheel, having an inner rim and an outer rim, and flexible connections for these rims, consisting of overlapping housings extending toward each other from the inner and outer rims, bearings carried by said housings, movement-responsive means interposed between these bearings, dished rings supported on the bearings, and a tubular resilient non-metallic cushion arranged between and supported by the rings and responsive to the movement of the bearings.

In testimony whereof I have hereunto set my hand this seventh day of October A. D. 1922.

FREDERICK STITZEL.

Witnesses:
  LAUR ISAACS,
  SAM'L S. LORDS.